May 17, 1927.
G. H. WORRALL
1,628,760
CHEMICAL RESISTANT LINING
Filed July 5, 1924
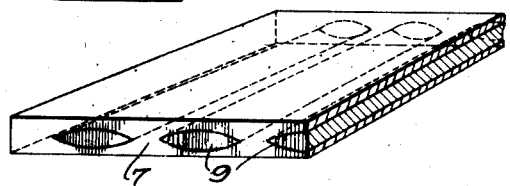
Fig. 1.
Fig. 2.
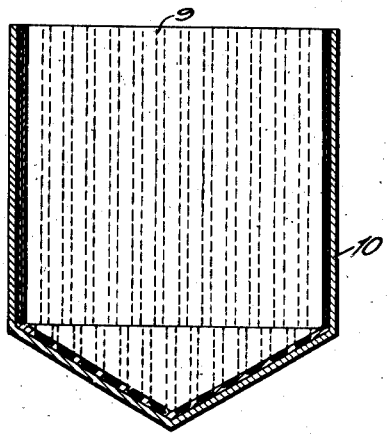
Fig. 3.
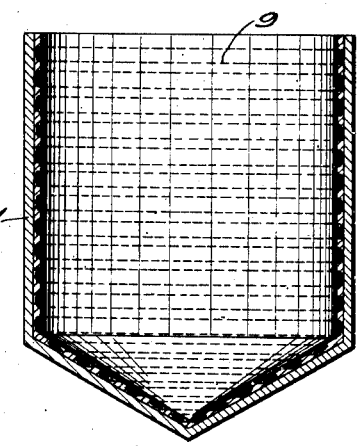
Fig. 4.
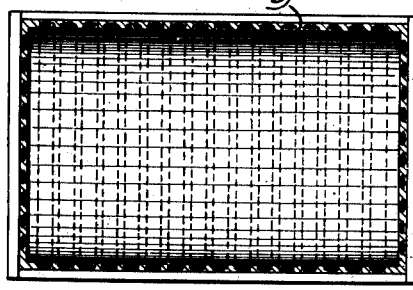
Fig. 5.
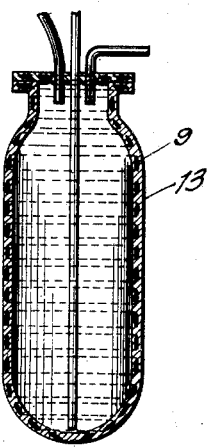
Fig. 6. Fig. 7.
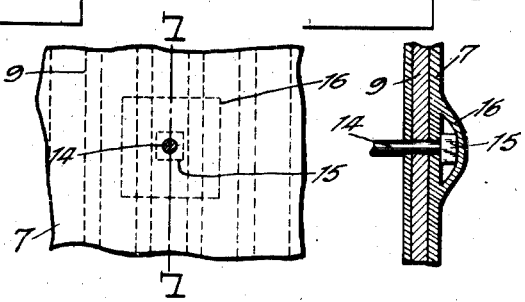
Inventor.
GEORGE H. WORRALL.
By John N Brumninger
Attorney.

Patented May 17, 1927.

1,628,760

UNITED STATES PATENT OFFICE.

GEORGE H. WORRALL, OF KIRKWOOD, MISSOURI.

CHEMICAL-RESISTANT LINING.

Application filed July 5, 1924. Serial No. 724,412.

This invention relates to chemical resistant linings, and more particularly to a lining in which the body or exposed face thereof is chemical lead.

In chemical containers, such as tanks, vats, stills or agitators, the most satisfactory lining heretofore used is chemical or unalloyed lead. Such a lining must, however, not only be fastened to its support but it must be made continuous by burning the edges of the sheet or sheets together. Such a lining is also frequently subjected to pressure which may be internal pressure above atmospheric pressure, or when the internal pressure is below atmospheric pressure, then the lining is subjected to atmospheric pressure. The lining is accordingly frequently subjected to a bulging or a collapsing pressure having the effect of distorting and even rupturing the lining. In agitators the lining is also subjected to the action of the agitator element or moving fluid which exerts a pulling action on the lining, thereby causing it to buckle or pull.

Chemical lead is satisfactory at low temperatures but at higher temperatures it is subject to expansion and contraction, and because of its low elastic limit and low tensile strength, especially at the higher temperatures, it pulls and buckles so that the cross-sectional area or thickness is much reduced. On account of this fact and the conditions encountered in chemical containers as heretofore referred to, a lining of chemical lead requires frequent repair and replacement, which on account of the high cost of material and the high cost of repair work, results in high cost of maintenance, and moreover requires frequent interruptions of the processes.

The use of antimonial lead, which is lead alloyed with antimony, for chemical resistant linings has been attempted. While a lining of antimonial lead does not have the tendency to buckle at the higher temperatures that chemical lead has, and has a higher elastic limit and higher tensile strength at higher temperatures it readily disintegrates at a temperature above 150° F., especially when subjected to the action of sulphuric and other acids. It has also been proposed to utilize a duplex lining consisting of two joined sheets of antimonial lead and chemical lead with the chemical lead providing the inside face exposed to the acids. However, on account of the differences in the melting points of unalloyed lead and alloyed (antimony) lead, difficulties were encountered in the lead burning operations necessary to join the edges of the lining, with the result that such a duplex lining was unsuccessful and its use abandoned.

One of the objects of this invention is to provide a chemical resistant lining, which although having a body of chemical lead, is so reinforced as to provide a lining of great strength even at the higher temperatures and when subjected to acids, while presenting a surface of chemical lead exposed to the acid.

Another object is to provide such a lining which is so reinforced as to obviate the pulling, crawling or buckling even at the higher temperatures and when subjected to chemicals.

Further objects will appear from the detail description taken in connection with the accompanying drawing, in which:

Figure 1 is a perspective view showing a portion of a lining embodying this invention;

Figure 2 is a vertical sectional view of a chemical container showing the arrangement of the lining and the reinforcements therein;

Figure 3 is a view similar to Figure 2 but showing a different arrangement of the reinforcements to meet other conditions;

Figure 4 is a view similar to Figures 2 and 3 showing a still further arrangement of the reinforcements to meet still different conditions;

Figure 5 is a side elevation of an acid egg showing the arrangement of the reinforcements in the chemical lining;

Figure 6 is a face view of a chemical lining embodying this invention showing the method of fastening the lining to its support; and Figure 7 is a section on line 7—7, Figure 6.

In accordance with this invention the chemical resistant lining consists of a body of chemical lead and a reinforcement which is, however, enveloped by the lead as distinguished from being simply applied thereto in the form of another sheet. This reinforcement is, moreover, of such a character as to be of substantially the same elongation as the lead itself. Since, however, the purpose of the reinforcement is to strengthen the lining, the reinforcing metal used should be one which not only has a higher tensile strength and higher elastic limit than lead, but this strength and limit must be maintained at higher temperatures. Moreover the reinforcement should be capable of forming a weld or union with the lead. A suitable metal which meets all these requirements is antimonial lead containing from 6 to 10 percent of antimony.

A composite sheet adapted particularly as a chemical resistant lining is fully described in application Serial Number 724,411, filed July 5, 1924, and is also generally shown in Figure 1. It consists of a body 7 of chemical or unalloyed lead having reinforcing elements or bars 9 arranged therein in spaced and parallel relation and enveloped by the lead, and these bars as heretofore referred to are preferably made of antimonial lead. The process of making this sheet is briefly as follows: A lead slab is cast with cavities therein, which cavities preferably run along the slab in substantially parallel relation. Into these cavities is then poured antimonial lead and this is preferably done while the slab is still hot so that the body and reinforcements will form a union or weld. The slab is then elongated in any suitable manner, as by being passed through rolls as in the regular manufacture of sheet lead and this rolling is accomplished while the reinforced slab is still hot. The rolling is preferably in a direction along the reinforcements so that the bars of antimonial lead will become elongated with the lead body and flattened out laterally, with the result that the lining will have reinforcements therealong elongated therewith and welded thereto but enveloped by the lead. By suitably positioning the cavities in the slab the reinforcements may be nearer one face of the lead lining so as to give a larger wearing surface to the chemical resistant lining without in any way impairing its structural strength.

The lining may be applied to a chemical container in any suitable manner and to meet given conditions. Thus in an ordinary vertical vat 10 having, for instance, a cone bottom as shown in Figure 2, the lining may be so applied that the reinforcements 9 run vertically along the sides and slope downward along the bottom. In this way the reinforcements act to support the lining so that it can be simply hung from the top and in such a case pulling or buckling will be avoided. The sheets of the lining may be burned together in the usual manner without encountering any difficulties.

In a case where the container 11 such as that illustrated in Figure 3 is provided with agitating means having a tendency to pull the lining laterally, then it may be preferable to run these reinforcements 9 hoopwise around the container. In such a case circumferential movement of the liquid or agitator along the lining will not pull the lining out of shape nor buckle it, since the reinforcing elements 9 act as a frame-work to resist such movement, especially since the lining and reinforcements are welded together to form an integral structure and since the reinforcements impart the desired strength and supply the desired framework. This, however, leaves the interior face of the lining of chemical lead as desired and this chemical lead extends for the desired thickness.

In a container 12 such as shown in Figure 4, which is in the form of a horizontal cylinder, the reinforcements 9 also preferably are in the form of hoops like those of a barrel. It is obvious that these will support the lining not only against sagging due to gravity, but also will support the lining against the action of internal pressure, especially where a pressure is in excess of atmosphere. Where the internal pressure of such a container is below atmospheric pressure, then these reinforcements will likewise support the lining against collapsing.

In Figure 5 the acid egg 13 has a lining provided with reinforcements 9 which also extend hoopwise so as to not only support the lead against collapsing and keep the egg in shape, but also to support the same against either internal or external pressure depending upon whether the internal pressure is above or below atmospheric pressure.

A lining of the character described can be readily fastened to its support as shown in Figures 6 and 7. However, fasteners 14 may pass through the lining in the usual manner and these fasteners may either pass between a pair of reinforcements or through one of the reinforcements. The head 15 of the fastener is covered with a patch 16 of chemical lead, which may be readily burned onto the chemical lead face of the lining without difficulty to form a seal therefor. As stated heretofore the lining need only be supported at spaced points since the reinforcement acts as a framework. Accordingly fewer fasteners may be used.

It will, therefore, be seen that there is provided a chemical resistant lining which is so reinforced that there is a continuous union between the reinforcement and the lead body, which form a welded union so as to form an integral structure. While the strength of the lining is greatly increased by the reinforcement, exposure will be only of the chemical lead, which envelops the reinforcement, while the latter will be protected against exposure. Creeping and buckling is, therefore, entirely obviated and disintegration of the enveloped and protected reinforcement is avoided even if the lining is exposed to acid at high temperatures. The lining sheets may be readily joined by burning, since the reinforcements are imbedded and exposed only at the edges, while both faces to a considerable depth consist of chemical lead so that a sealed union may be formed by burning. A sealed union may also be formed by a patch joined to the lining by burning. It has, therefore, been found in practice that this lining effectively overcomes creeping or crawling even at the higher temperatures and even when subjected to acids or other chemicals. On account of the greater strength of a lining of a given weight as compared to the strength of an unreinforced chemical lead lining, a thinner lining may be used for a given requirement. This fact together with the cheapness of the antimonial lead results in economy and saving of material. Furthermore the durability of the sheet of this lining is much greater than a chemical lead lining so that the cost of maintenance is considerably reduced. The lining may also be used in places where pressures are either above or below atmospheric pressure without liability of either bulging or collapsing.

It is obvious that various changes may be made in details without departing from the spirit of this invention; it is, therefore, to be understood that this invention is not to be limited to the specific details shown and described.

Having thus described the invention, what is claimed is:

1. A container for chemicals having a lining of chemical or unalloyed lead provided with alloyed lead reinforcements which are embedded in the lead body, and means for attaching said lining, said reinforcements extending along the lining in order to support the lead body at the points of attachment against sagging or pulling.

2. A container having a lining composed of lead, said lining having embedded therein at spaced intervals reinforcing elements composed of alloyed lead of greater tensile strength and elastic limit than the body of the lining, whereby the lining is prevented from buckling at high temperatures.

3. A container having a lining composed of lead, said lining having embedded therein at spaced intervals reinforcing elements composed of alloyed lead of substantially the same elongability as the body of the lining, said elements being of greater tensile strength than the body of the lining whereby the lining is prevented from buckling at high temperatures.

4. A container having a lining composed of lead, said lining having embedded and welded therein at spaced intervals reinforcing elements composed of alloyed lead of substantially the same elongability and of greater tensile strength than the body of the lining, whereby the lining is prevented from buckling at high temperatures.

5. A container having a lining composed of lead, said lining having embedded therein at spaced intervals reinforcing elements composed of alloyed lead of greater tensile strength and elastic limit than the body of the lining, whereby the lining is prevented from buckling at high temperatures, and means for attaching said lining to the container comprising spaced elements adjacent the reinforcing elements in order to support the lead body at the points of attachment against sagging or pulling.

6. A container having a lining composed of lead, said lining having embedded therein at spaced intervals reinforcing elements composed of alloyed lead of greater tensile strength and elastic limit than the body of the lining, whereby the lining is prevented from buckling at high temperatures, and means for attaching said lining to the container comprising spaced elements adjacent the reinforcing elements in order to support the lead body at the points of attachment against sagging or pulling, the heads of the attaching elements being covered by the body of the lining.

7. A container having a lining composed of chemical or unalloyed lead, said lining having embedded therein at spaced intervals reinforcing elements composed of antimonial lead of greater tensile strength and elastic limit than the body of the lining, whereby the lining is prevented from buckling at high temperatures, and means for attaching said lining to the container comprising spaced elements adjacent the reinforcing elements in order to support the lead body at the points of attachment against sagging or pulling.

In testimony whereof I affix my signature this 24th day of June, 1924.

GEORGE H. WORRALL.